US012705140B2

(12) United States Patent
Kunzle et al.

(10) Patent No.: US 12,705,140 B2
(45) Date of Patent: Aug. 11, 2026

(54) CONTINUOUS DATA PROTECTION USING RETROACTIVE BACKUP SNAPSHOTS

(71) Applicant: Salesforce, Inc., San Francisco, CA (US)

(72) Inventors: Adrian Kunzle, New York, NY (US); Ariel Berkman, Herzliya (IL); Etai Litov, Gan Yavne (IL); Jason K. S. Choy, Short Hills, NJ (US)

(73) Assignee: Salesforce, Inc., San Francisco, CA (US)

( * ) Notice: Subject to any disclaimer, the term of this patent is extended or adjusted under 35 U.S.C. 154(b) by 76 days.

(21) Appl. No.: 18/183,971

(22) Filed: Mar. 15, 2023

(65) Prior Publication Data

US 2023/0222038 A1 Jul. 13, 2023

Related U.S. Application Data

(63) Continuation-in-part of application No. 17/528,290, filed on Nov. 17, 2021, now Pat. No. 11,630,816.

(60) Provisional application No. 63/115,076, filed on Nov. 18, 2020.

(51) Int. Cl.
*G06F 16/23* (2019.01)
*G06F 11/1446* (2026.01)

(52) U.S. Cl.
CPC ...... *G06F 11/1461* (2013.01); *G06F 16/2365* (2019.01); *G06F 2201/80* (2013.01); *G06F 2201/84* (2013.01)

(58) Field of Classification Search
CPC ............. G06F 11/1461; G06F 16/2365; G06F 2201/80; G06F 2201/84
See application file for complete search history.

(56) References Cited

U.S. PATENT DOCUMENTS

| | | | | |
|---|---|---|---|---|
| 6,460,055 | B1 | 10/2002 | Midgley et al. | |
| 9,971,655 | B1 * | 5/2018 | Li | G06F 11/1438 |
| 10,210,171 | B2 * | 2/2019 | Outcalt | G06F 16/27 |
| 10,437,783 | B1 * | 10/2019 | Cohen | G06F 16/2365 |
| 10,853,182 | B1 * | 12/2020 | Vig | G06F 16/23 |
| 11,080,336 | B2 | 8/2021 | Van Dusen | |
| 11,157,463 | B2 | 10/2021 | Barabas et al. | |
| 2007/0185923 | A1 * | 8/2007 | Nishikawa | G06F 11/1471 |
| 2008/0121690 | A1 | 5/2008 | Carani et al. | |

(Continued)

OTHER PUBLICATIONS

U.S. Appl. No. 18/468,759 Office Action dated Jul. 19, 2024.
U.S. Appl. No. 16/950,963 Office Action dated Apr. 3, 2023.

*Primary Examiner* — Merilyn P Nguyen
(74) *Attorney, Agent, or Firm* — Meitar Patents Ltd.; Daniel Kligler

(57) ABSTRACT

Methods, storage systems and computer program products create a transactionally consistent backup of a database by generating, during a time period beginning with a first time and ending with a second time, a copy of the database including multiple tables. During the time period, queries that request updates to the tables are periodically generated and conveyed to a software system managing the database, responses including updates to the tables are received responsively to the periodic queries, and the received updates are stored to a journal. A set of the updates not stored in the copy are identified, in the journal, and copy of the database is updated with the updates so as to ensure that the copy includes the transactionally consistent backup of the database.

20 Claims, 12 Drawing Sheets

(56) References Cited

U.S. PATENT DOCUMENTS

| | | | | |
|---|---|---|---|---|
| 2008/0307021 | A1* | 12/2008 | Okada | G06F 11/1471 714/E11.12 |
| 2008/0313005 | A1 | 12/2008 | Nessland et al. | |
| 2009/0240744 | A1* | 9/2009 | Thomson | G06F 16/2358 |
| 2010/0114831 | A1* | 5/2010 | Gilbert | G06F 16/27 707/648 |
| 2011/0295806 | A1* | 12/2011 | Erofeev | G06F 11/2094 707/634 |
| 2012/0169842 | A1 | 7/2012 | Chuang et al. | |
| 2013/0132397 | A1* | 5/2013 | MacMillan | G06F 16/2272 707/744 |
| 2013/0275462 | A1 | 10/2013 | Jung | |
| 2013/0297610 | A1 | 11/2013 | Devarakonda et al. | |
| 2014/0058801 | A1 | 2/2014 | Deodhar et al. | |
| 2015/0089134 | A1* | 3/2015 | Mukherjee | G06F 15/8084 711/114 |
| 2015/0156213 | A1 | 6/2015 | Baker | |
| 2016/0092484 | A1 | 3/2016 | Finkler | |
| 2017/0116552 | A1 | 4/2017 | Deodhar et al. | |
| 2017/0132429 | A1* | 5/2017 | Bell | H04L 9/0891 |
| 2017/0329983 | A1 | 11/2017 | Grant et al. | |
| 2020/0089798 | A1 | 3/2020 | Ganichot et al. | |
| 2020/0110792 | A1 | 4/2020 | Tsabba | |
| 2020/0389495 | A1 | 12/2020 | Crabtree et al. | |
| 2021/0019288 | A1 | 1/2021 | Pang | |
| 2022/0197904 | A1 | 6/2022 | Gillis | |

* cited by examiner

HEADER RECORD 178
FIELD NAME
180
NORMALIZED EVENT RECORD 172
FIELD VALUE
184
170
OBJECT DATA
KEY VALUE
186
ORG. ID
187
OBJECT ID
188
RECORD ID
190
OPERATION
192
FIELD ID
194
NEW VALUE
196
TIMESTAMP
198
52
OBJECT ID
200
STREAM ID
202
CURRENT SCHEMA
204
FIRST REPLAY POSITION
206
ORG. ID
208
174
SCHEMA RECORD
176
SCHEMA DATA

HEADER RECORD 236
FIELD NAME 238
DATA RECORD 240
KEY VALUE 242
TIMESTAMP 244
FIELD VALUE 246
RECORD ID 280
OPERATION 282
SNAPSHOT DATA FILE 231
22B
CRM OBJECT SNAPSHOT
230
248 250 63
SOURCE SNAPSHOT 284
DESCRIPTOR FILE
244
ATTACHMENT UPDATES
286

CONTINUOUS DATA PROTECTION USING RETROACTIVE BACKUP SNAPSHOTS

CROSS-REFERENCE TO RELATED APPLICATIONS

This application is a continuation-in-part of U.S. patent application Ser. No. 17/528,290, filed Nov. 17, 2021, which claims the benefit of U.S. Provisional Patent Application 63/115,076, filed Nov. 18, 2020. All of the above related applications are incorporated herein by reference.

FIELD OF THE INVENTION

The present invention relates generally to data backup, and particularly to generating a custom snapshot of customer relationship management (CRM) data.

BACKGROUND

Creating and maintaining snapshots is one the techniques employed by data storage facilities for disaster recovery planning. A snapshot may be a copy of data residing on a storage system that is created at a particular point in time Since a full backup of a large data set can take a long time to complete, a snapshot may define the dataset to be backed up. Data associated with the snapshot is static, and is therefore protected from any subsequent changes to the data on the volume (e.g., a database update).

The description above is presented as a general overview of related art in this field and should not be construed as an admission that any of the information it contains constitutes prior art against the present patent application.

SUMMARY

There is provided, in accordance with an embodiment of the present invention, a method for generating a transactionally consistent backup of a database, including generating, during a time period beginning with a first time and ending with a second time, a copy of the database including multiple tables. During the time period, the method also includes periodically generating and conveying, to a software system managing the database, queries that request updates to the tables, receiving, responsively to the periodic queries, responses including updates to the tables, and storing the received updates to a journal. The method additionally includes identifying, in the journal, a set of the updates not stored in the copy, and updating, by a processor, the copy of the database with the updates so that the copy includes the transactionally consistent backup of the database.

In one embodiment, the journal and the copy of the database include respective structured text files.

In some embodiments, the structured text files include comma-separated value (CSV) files.

In another embodiment, the journal and the copy of the database include respective binary files.

In an additional embodiment, the journal includes one or more JavaScript Object Notation (JSON) files.

In a supplemental embodiment, the software system includes a customer relationship management (CRM) application, and wherein the query includes a call to an application programming interface (API) of the CRM application.

In some embodiments, wherein the tables include respective sets of fields, and wherein a given response in a plurality of updates to one or more of the fields in one or more of the tables.

There is also provided, in accordance with an embodiment of the present invention, an apparatus for generating transactionally consistent backup of a database, including a memory, and one or more processors configured to generate, during a time period beginning with a first time and ending with a second time, a copy of the database including multiple tables. During the time period the one or more processors are additionally configured to per generate and convey, to a software system managing the database, queries that request updates to the tables during the time period, to receive, responsively to the periodic queries, responses including updates to the tables, and to store the received updates to a journal. The one or more processors are further configured to identify, in the journal, a set of the updates not stored in the copy, and to update the copy of the database with the updates so that the copy includes a transactionally consistent backup of the database.

There is additionally provided, in accordance with an embodiment of the present invention, a method including specifying a quota of snapshots of a database for storage in a memory, receiving, by a processor, a request to generate a new snapshot of the database, identifying, in the memory a current number of the snapshots and their respective creation dates, and upon detecting that the current number exceeds the quota, identifying a given snapshot whose creation date is earlier than the creation date of the remaining snapshots, deleting the identified snapshot from the memory, and generating, in the memory, the requested snapshot.

In some embodiments, the snapshots include respective snapshot frequencies having respective quotas, wherein the new snapshot includes a given snapshot frequency, and wherein upon detecting that the current number exceeds the quota includes detecting that the current number of the snapshots including the given snapshot frequency exceeds the quota for the given snapshot frequency.

In one embodiment, one of the snapshot frequencies includes a monthly snapshot.

In another embodiment, one of the snapshot frequencies includes a weekly snapshot.

In an additional embodiment, one the snapshot frequencies includes a daily snapshot.

In a further embodiment, wherein one of the snapshot frequencies includes a retroactive snapshot for a specified date and time, and wherein the quota for the snapshots including the retroactive snapshot frequency includes an even number.

In some embodiments, the method further includes identifying a time of the request, wherein the specified quota includes a specified time period, wherein the snapshots include respective creation dates, and wherein detecting that the current number exceeds the quota includes detecting that a difference between the specified time period of the given snapshot and the identified time exceeds the specified time period.

In a supplemental embodiment, the journal and the copy of the database includes respective structured text files.

In some embodiments, the structured text files include comma-separated value (CSV) files.

In one embodiment, wherein the journal and the copy of the database include respective binary files.

In another embodiment, the software system includes a customer relationship management (CRM) application, and wherein the query includes a call to an application programming interface (API) of the CRM application.

In an additional embodiment, the tables include respective sets of fields, and wherein a given response includes a plurality of updates to one or more of the fields in one or more of the tables.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
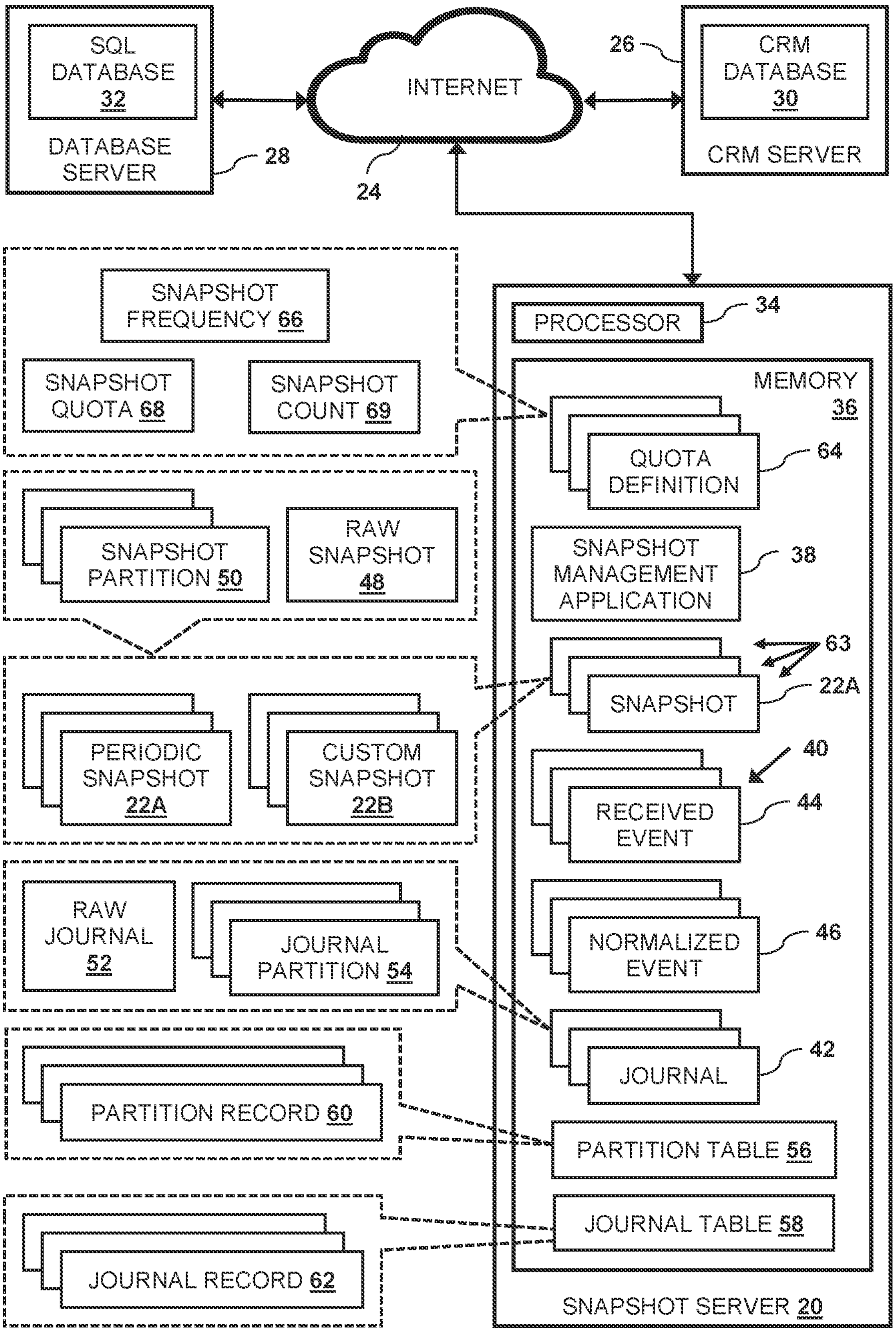
FIG. 1 is a block diagram that shows an example of a snapshot server that is configured to use previously stored periodic snapshots and journal files to create custom snapshots of customer relationship manager (CRM) data, in accordance with an embodiment of the present invention.

A transactionally consistent backup of data comprises a type of backup that ensures the integrity of the data being backed up. It guarantees that the backup represents the data in a specific transactional state, which means that the data is backed up in a consistent state as it existed at a specific point in time. This type of backup is achieved by using techniques such as snapshotting, replication, or journaling, which capture the state of the data at the point in time of the backup. With transactionally consistent backups, the data can be restored to the exact state it was in at the time of the backup, which is crucial for critical systems or applications that require a high degree of data accuracy and consistency.

In embodiments described herein, backups (including transactionally consistent backups) may also be referred to as snapshots. A snapshot of a database comprises a read-only, static copy of the database at a specific point in time. It provides a way to view or access the database as it existed at the moment the snapshot was taken, without affecting the original database. Database snapshots are created by taking a point-in-time copy of the data pages in the database and storing them as a separate, read-only file. Database snapshots are useful for a variety of tasks, such as reporting, data analysis, and backup and recovery. They can also be used as a way to provide a consistent view of the data to applications that require access to multiple databases Cr multiple versions of the same database.

A first embodiment of the present invention provides methods, systems and computer program products for generating a generating a transactionally consistent backup of a database. As described hereinbelow, during a time period beginning with a first time and ending with a second time, a copy of the database comprising multiple tables is generated. During the time period, queries that request updates to the tables are periodically generating and conveyed to a software system managing the database. Upon receiving, responsively to she periodic queries, responses comprising updates to the tables, the received updates are stored to a journal. Finally, upon identifying a set of the updates not stored in the copy, and the copy of the database is updated with the updates so that the copy comprises a transactionally consistent backup of the database.

A second embodiment of the present invention provides methods, systems and computer program products for managing a set of snapshots. As described hereinbelow, a quota of snapshots of a database for storage in a memory is specified, and upon receiving a request to generate a new snapshot of the database, a current number of the snapshots and their respective creation dates is identified in the memory. Finally, upon detecting that the current number matches or exceeds the quota, a given snapshot whose creation date is earlier than the creation date of the remaining snapshots is identified, the identified snapshot is deleted from the memory, and the requested snapshot is generated in the memory.

System Description

FIG. 1 is a block diagram that shows an example of a snapshot server 20 that is configured to generate snapshots 22, in accordance with an embodiment of the present invention. In the configuration shown in FIG. 1, snapshot server 20 is coupled to a public network 24 such as she Internet, which is also coupled to a customer relationship management (CRM) server 26 and a database server 28.

CRM server 26 is configured to store and manage a CRM database 30, and database server 28 is configured to store and manage a database 32 such as a Structured Query Language database. Snapshots 22 can be differentiated by appending a letter to the identifying numeral, so that the snapshots comprise one or more periodic snapshots 22A and a custom snapshot 22B. In some embodiments, snapshot server 22 is configured to periodically generate snapshots 22A that comprise read-only static views of CRM database 30 at specific respective times. In embodiments described herein, a specific time references a specific time of day on a specific date.

In the configuration shown in FIG. 1, snapshot server 20 comprises a snapshot processor 34 and a snapshot memory 36 that stores snapshots 22 and a snapshot management application 38 that the snapshot processor can execute to perform embodiments described herein. Memory 36 can also store an event stream 40 and a set of journals 42.

Upon creating a given periodic snapshot 22A, snapshot server 20 can receive, from CRM server 26, event stream 40 that comprises updates to CRM database subsequent to the time that the snapshot server created the given periodic snapshot. Upon receiving the given event stream, snapshot server 20 can store the updates in the given event stream to the corresponding journal 42. Event stream 40 may comprise a series of received events 44 and a corresponding series of normalized events 46, which are described respectively in the description referencing FIGS. 4 and 5 hereinbelow.

As described supra, snapshot server 20 generates custom snapshot 225 from data stored in a given periodic snapshot 22A and a given event journal 42. However, snapshots 22A and journals 42 may comprise large amounts of data. In the configuration shown in FIG. 1, each snapshot 22 may comprise a raw snapshot 48 and a corresponding set of partitioned snapshots 50. For a given snapshot 22, the raw snapshot comprises a single file storing all the snapshot data. To enable easier manipulation of the data in a given raw snapshot 48, snapshot server 20 can the given raw snapshot of the given snapshot into its corresponding set of smaller partitioned snapshots 50.

Likewise, in the configuration shown in FIG. 1, each journal 42 may comprise a raw journal 52 and a corresponding set of journal partitions 54. For a given journal 52, the raw journal stores all the updates to CRM database 30 subsequent to the most recent previous periodic snapshot 22A. To enable easier manipulation of the data in a given raw journal 52, snapshot server 20 can spilt the raw journal of the given journal into a corresponding set of smaller partitioned journals 54.

In some embodiments, memory 36 can also store a partition table 56 and a journal table 58. Partition table 56 may comprise a set of partition records 60 that can store information on how snapshots 22 and journals 92 are partitioned, and Journal table 58 may comprise a set of journal records 62 that store information about data stored in journals 92.

In additional embodiments, snapshots 22 may comprise respective snapshot types 63, and memory 36 may also comprise a set of quota definitions 64, each of the quota definitions comprising a snapshot frequency 66, a snapshot quota 68 and a snapshot count 69. In one embodiment, a given snapshot quota 68 in a given quota definition 64 may comprise a value indicating a maximum number of snapshots 22 (i.e., for the snapshot frequency in the given quota definition). Likewise, a given snapshot count 69 in a given quota definition 64 may comprise a value indicating a current number of snapshots 22 (i.e., for the snapshot frequency in the given quota definition). In an alternative embodiment, a given snapshot quota may comprise a time period for retaining a given snapshot 22 in memory 36.

Examples of both snapshot types 63 and snapshot frequencies 66 include Monthly, Weekly, Daily and Custom. In some embodiments, processor 34 can compare the snapshot type for a given snapshot 22 to snapshot frequencies 66 in quota definitions 64, and upon detecting a match between the snapshot type of the given snapshot and a given snapshot frequency 66 in a given quota definition 64, the processor can associate the snapshot quota in the given quota definition with the given snapshot. For example, for a given quota definition 64:

- If, for the given definition, the snapshot frequency is Monthly and the snapshot quota comprises a value such as 120 or a time period such as 10 years, then processor 34 can "assign" the snapshot quota to snapshots 22 whose snapshot type 63 is also Monthly.
- If, for the given definition, the snapshot frequency is Weekly and the snapshot quota comprises a value such as 104 or a time period such as 2 years, then processor 34 can assign the snapshot quota to snapshots 22 whose snapshot type 63 is also Weekly.
- If, for the given definition, the snapshot frequency is Daily and the snapshot quota comprises a value such as 180 or a time period such as 6 months, then processor 34 can assign the snapshot quota to snapshots 22 whose snapshot type 63 is also Daily.
- If, for the given definition, the snapshot frequency is Custom and the snapshot quota comprises a value such as 6 or 8, then processor 34 can assign the snapshot quota to snapshots 22 whose snapshot type 63 is also Custom. Creating snapshots 22 whose respective frequency type 63 is Custom is described in the description referencing FIG. 12 hereinbelow. Processor 34 typically creates these snapshots 22 in pairs so as to investigate data stored in database 32 by isolating (i.e., "bookending") any problems with the data in the database (i.e., each of the investigations can use a pair of the snapshots). Therefore, the snapshot quota for snapshots 22 whose respective frequency type 65 is Custom may comprise an even number. For example, if the snapshot quota is six, then processor 34 can perform, three investigations, if the snapshot quota is eight, then processor 34 can perform four investigations, and so on.

In embodiments herein, the snapshot frequency for a given snapshot 22 comprises the snapshot frequency matching the snapshot type of the given snapshot. Likewise, the snapshot quota for a given snapshot 22 comprises the snapshot quota in the quota definition whose snapshot frequency 63 matched the snapshot type of the given snapshot.

Figure 2:
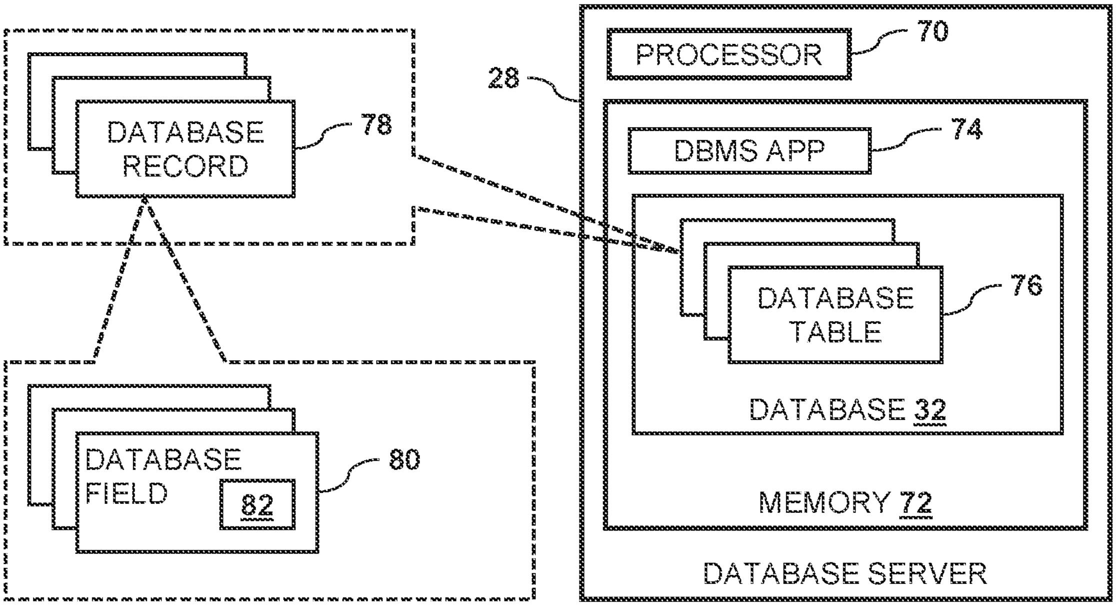
FIG. 2 is a block diagram of a database server configured to store the CRM data, in accordance with an embodiment of the present invention.

FIG. 2 is a block diagram of database server 28, in accordance with an embodiment of the present invention. Database server 28 may comprise a database processor 70 and a database memory 72 that can store a database management (DBMS) application 74 and database 32. One example of DBMS application 74 comprises ORACLE DATABASE™ (produced by Oracle Corporation, 500 Oracle Parkway, Redwood City, CA 94065 USA) that processor 70 can execute to manage a SQL database such as database 32.

Database 32 typically comprises a set of database tables 76 that comprise respective sets of database records 78. Each database record 18 may comprise a set of database fields 80 that can store respective stored values 82 (e.g., text and numeric data).

Figure 3:
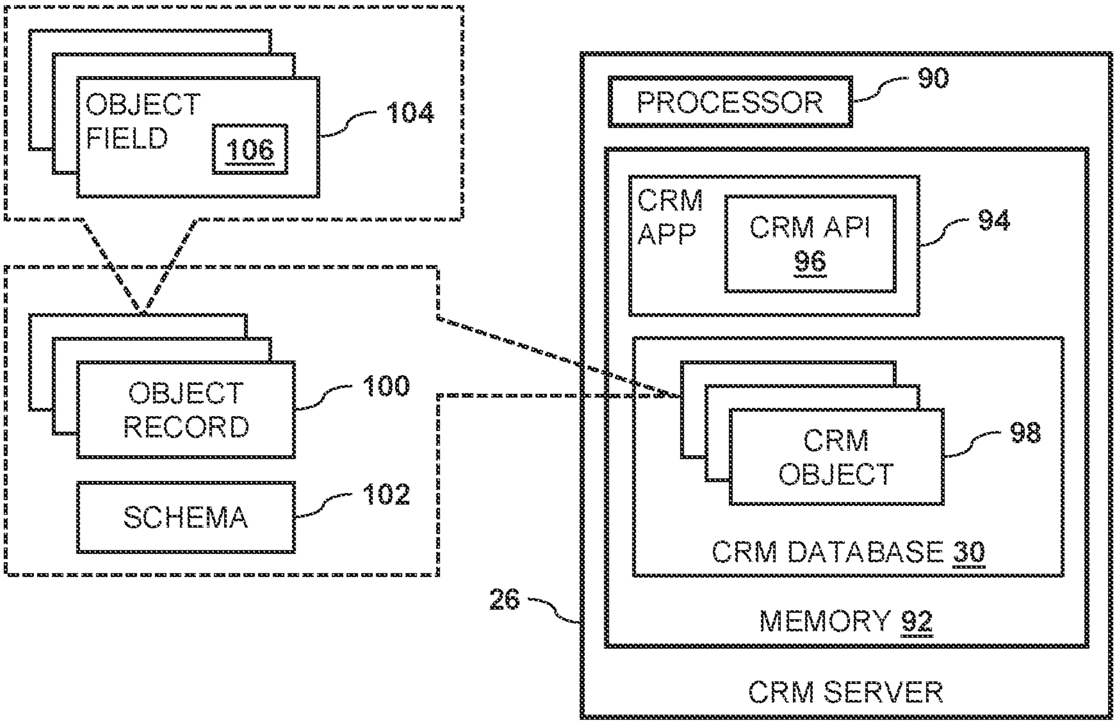
FIG. 3 is a block diagram that shows an example of a CRM server that is configured to manage the CRM data, in accordance with an embodiment of the present invention.

FIG. 3 is a block diagram of CRM server 26, in accordance with an embodiment of the present invention. CRM server 26 may comprise a CRM processor 90 and a CRM memory 92 that can store a CRM application 94 (also known as a CRM system) and CRM database 30. In some embodiments, CRM application 94 may comprise a CRM application programming interface (API) 96 that can enable snapshot management application 38 (or any other software application executing on a computer coupled to Internet 24) to interact with the CRM application.

One example of CRM application 94 comprises SALESFORCE™ (produced by salesforce.com, inc., Salesforce Tower 3rd Floor, 415 Mission Street, San Francisco, CA 94105 USA) that processor 90 can execute to manage CRM database 32. In this example, CRM API 96 may comprise Salesforce's CHANGE DATA CAPTURE™ (CDC) API that enables snapshot management application 38 to request and receive updates to CRM database 30.

CRM database 32 typically comprises a set of CRM objects 98 (also known as CRM tables) that comprise respective sets of object records 100 and schemas 102. Each object record 100 may comprise a set of object fields 104 that can store respective object values 106. In one embodiment, CRM objects 98, CRM records 100, object fields 104 and object values 106 may comprise logical entities that respectively store mappings to database tables 76, database records 18, database fields 80 and database values 82. In this embodiment, schemas 102 can store mappings between object fields 104 and database fields 80.

Examples of memories 36, 72 and 92 include dynamic random-access memories and non-volatile random-access memories. In some embodiments, the memories may comprise non-volatile storage devices such as hard disk drives and solid-state disk drives.

Processors 34, 70 and 90 typically comprise general-purpose central processing units (CPU) or special-purpose embedded processors, which are programmed in software or firmware to carry coin the functions described herein. This software may be downloaded to servers 20, 26 and 28 in electronic form, over a network, for example. Additionally or alternatively, the software may be stored on tangible, non-transitory computer-readable media, such as optical, magnetic, or electronic memory media. Further additionally or alternatively, at least some of the functions of processors 34, 70 and 90 may be carried out by hard-wired or programmable digital logic circuits.

In some embodiments, tasks described herein performed by snapshot management application 38 and/or processor 34 may be split among multiple physical and/or virtual computing devices. In other embodiments, these tasks may be performed in a data cloud.

Figure 4:
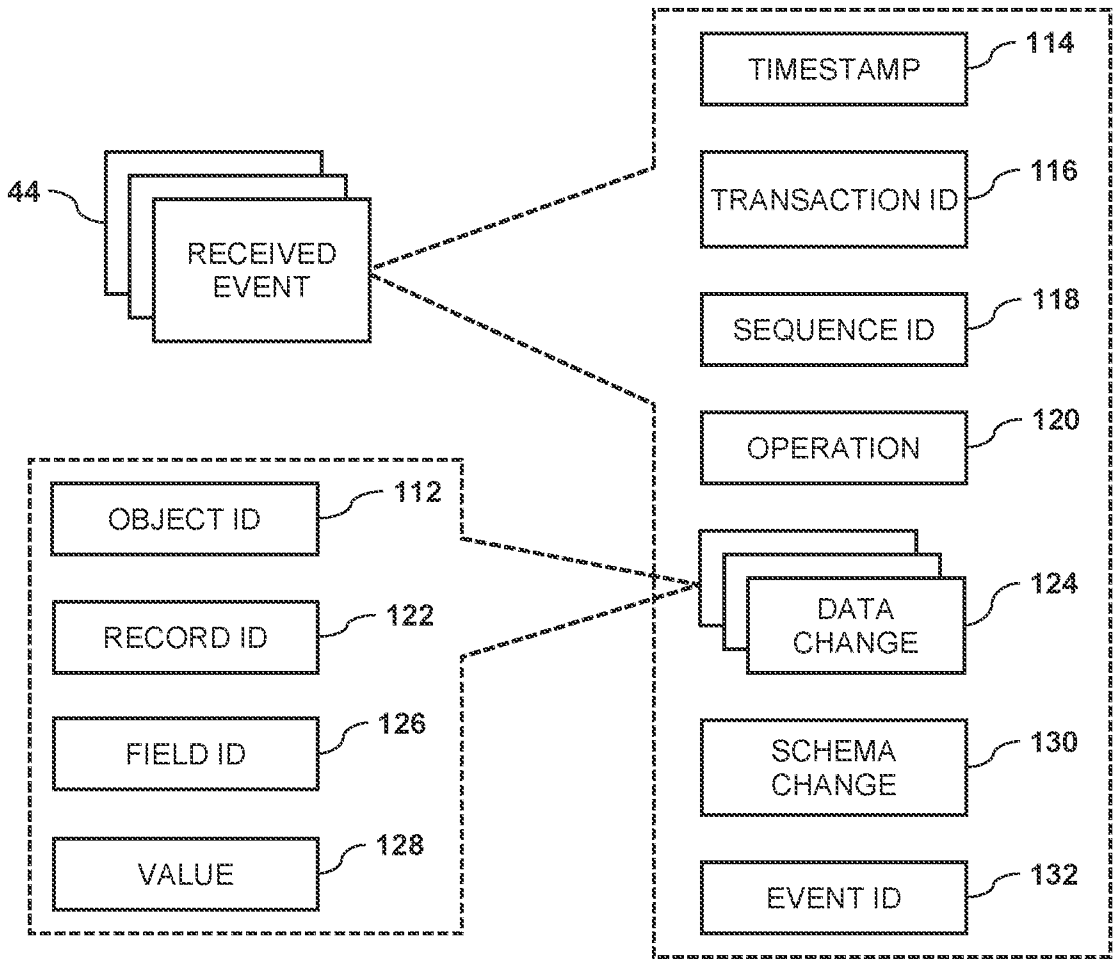
FIG. 4 is a block diagram that: shows an example of a received event comprising an update to the CRM data, accordance with an embodiment of the present invention.

FIG. 4 is a block diagram that shows data components of a given received event 44, in accordance with an embodiment of the present invention. As described hereinbelow, the received events 44 correspond to updates to CRM database 30. In some embodiments, upon processor 34 receiving the updates in response to an API call conveyed by snapshot management application 38 to CRM API 96, the snapshot processor can store the updates to memory 36 in events 44.

In some embodiments, processor 34 can store received events 44 as JavaScript Object Notation (JSON) files (i.e., journal 42 may comprise one or more JSON files). JSON files typically comprise semi-structured data files that are a form of structured data that does not obey the tabular structure of data models associated with relational databases or other forms of data tables. As opposed to structured text files (e.g., CSV files), semi-structured data files typically include tags or other markers to separate semantic elements and enforce hierarchies of records and fields within the data. Semi-structured data is sometimes referred to as self-describing structures.

In the configuration shown in FIG. 4, each given received event 44 may comprise:

- A timestamp 114 indicating a date and a time of the given event (i.e., an update to CRM database 30).
- A transaction ID 116 and a sequence ID 118. In some instances, a given update to CRM database 30 may comprise a transaction that (due to its size) processor 90 can split into multiple sequences. In these instances, processor 90 can assign a unique transaction ID 116 to the transaction, split the transaction into a set of multiple sequences, assign a sequential sequence ID 118 to the sequences, and transmit the sequences as separate updates. In the event snapshot management application 38 does not receive the updates in the (correct) sequential order, storing the transaction IDs and the sequence IDs to events 44 can enable the snapshot management application to reconstruct the transaction in the correct order.
- An operation 120. Examples of operations 120 include, but are not limited to, adding one or more new object records 100, deleting one or more object records 100 and updating values 106 in one or more object fields 104.
- One or more data changes 124. Each change may comprise:
  - An Object identifier (ID) 112 that references a given CRM object 98.
  - A record ID 122 referencing a given object record 104 in the given object referenced by object ID 112).
  - A field ID 126 referencing a given object field 106 in the given object record referenced by record ID 122.
  - A new value 128 indicating value 106 stored in the given object field 104 referenced by field ID 126.
- A schema change 130 (if any) that provides details of any changes to schema 102 for the given CRM object. Typically, the given event may comprise a given data change 124 or a given schema change 130.
- A unique (i.e., for a given received event 44) event ID 132 that can be generated by processor 34.

Figure 5:
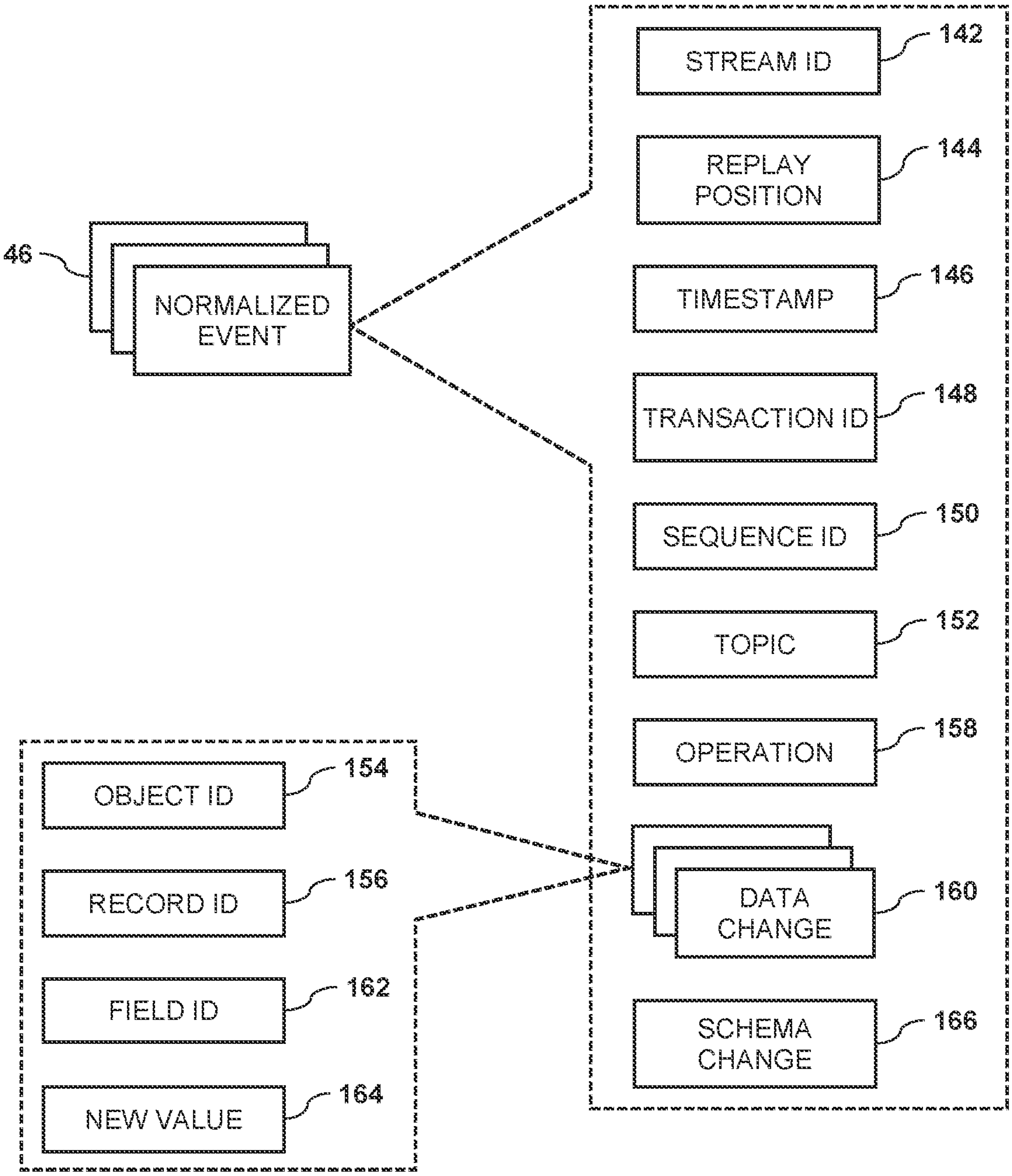
FIG. 5 is a block diagram that shows an example of a normalized version of the received event, in accordance with an embodiment of the present invention.

FIG. 5 is a block diagram that shows data components of a given normalized event 46, in accordance with an embodiment of the present invention. In some embodiments, processor 34 can perform normalization to address and correct data issues in event stream 40 such as:

- The way different versions of CRM application 94 stores data in object records 100. For example, subsequent to the most recent snapshot 22A, CRM application 94 may have been upgraded, wherein the upgrade changed the way data was stored in CRM database 30.
- Resolve any differences (e.g., upper/lower case) in names of object fields 104 in object records 100 (i.e., whose updates are stored in received events 44). In one embodiment, processor 34 can detect these differences in events 44 received at different times from a single CRM server 26. In another embodiment, processor 34 can detect these differences in events received from different CRM servers 26.
- For example, the difference may comprise upper/lower case differences in the names of object fields 104. For example, the name a given object field 104 in a given CRM object 98 may comprise "Type" in a first given received event 44 and may comprise "type" in a second given received event
- Resolve any differences in that way CRM application 94 stores data to a given object field 104. In one embodiment, processor 34 can detect these differences in events 44 received at different times from a single CRM server 26. In another embodiment, processor 34 can detect these differences in events received from different CRM servers 26

In some embodiments, the difference may comprise the format that CRM application 94 uses to store a date value, In a first example, a first CRM server 26 may store a timestamp as separate date and time values, while a second CRM server 26 stores the date and time values as a single timestamp value.

In a second example, a first CRM server 26 may store a timestamp that comprises sub-seconds, while a second CRM server 26 may not include sub-seconds in its stored timestamps.

In a third example, a first CRM server 26 may store a timestamp as an integer value (e.g., representing seconds from Jan. 1, 1970), while a second CRM server 26 may store a timestamp as a text string.

Remove any non-standard (e.g., non-text/numeric) characters from values 106.

Normalized events 46 typically have a one-to-one correspondence with received events 44. In some embodiments, processor 34 can store normalized events 46 as JavaScript Object Notation (JSON) files.

In the configuration shown in FIG. 4, each given normalized event 46 comprises a stream ID 142, a replay position 144, a timestamp 116, a transaction ID 148, a sequence ID 150, a tonic 152 (described hereinbelow), an operation 158, a data change 160 and a schema change 166. Each data change 160 comprises an object ID 154, a record ID 156, a field ID 162 and a new value 164.

Upon creating a given normalized event 46, processor 34 can store an identifier (e.g., a path and a file name) for the corresponding event stream 40 to stream ID 142, store event ID 132 in the corresponding raw data stream to replay position 144, and store a unique (i.e., for the normalized stream) value to record ID 156.

As described supra, normalized events may comprise topics 152. For example, in SALESFORCE™ environments, a given topic 152 may comprise a subscription subject (e.g., News, Sport, etc.).

In some embodiments, processor 34 can then copy, from the corresponding raw data stream to the given normalized event, timestamp 114 to timestamp 146, transaction ID 116 to transaction ID 148, sequence ID 117 to sequence ID 150, object ID(s) 112 to object ID(s) 154, operation 120 to operation 158, field IDs 126 and new values 128 in data change 124 respectively to field IDs 162 and new values 164 in any data changes 160, and schema change 130 (if it exists) to schema change 166.

Figure 6:
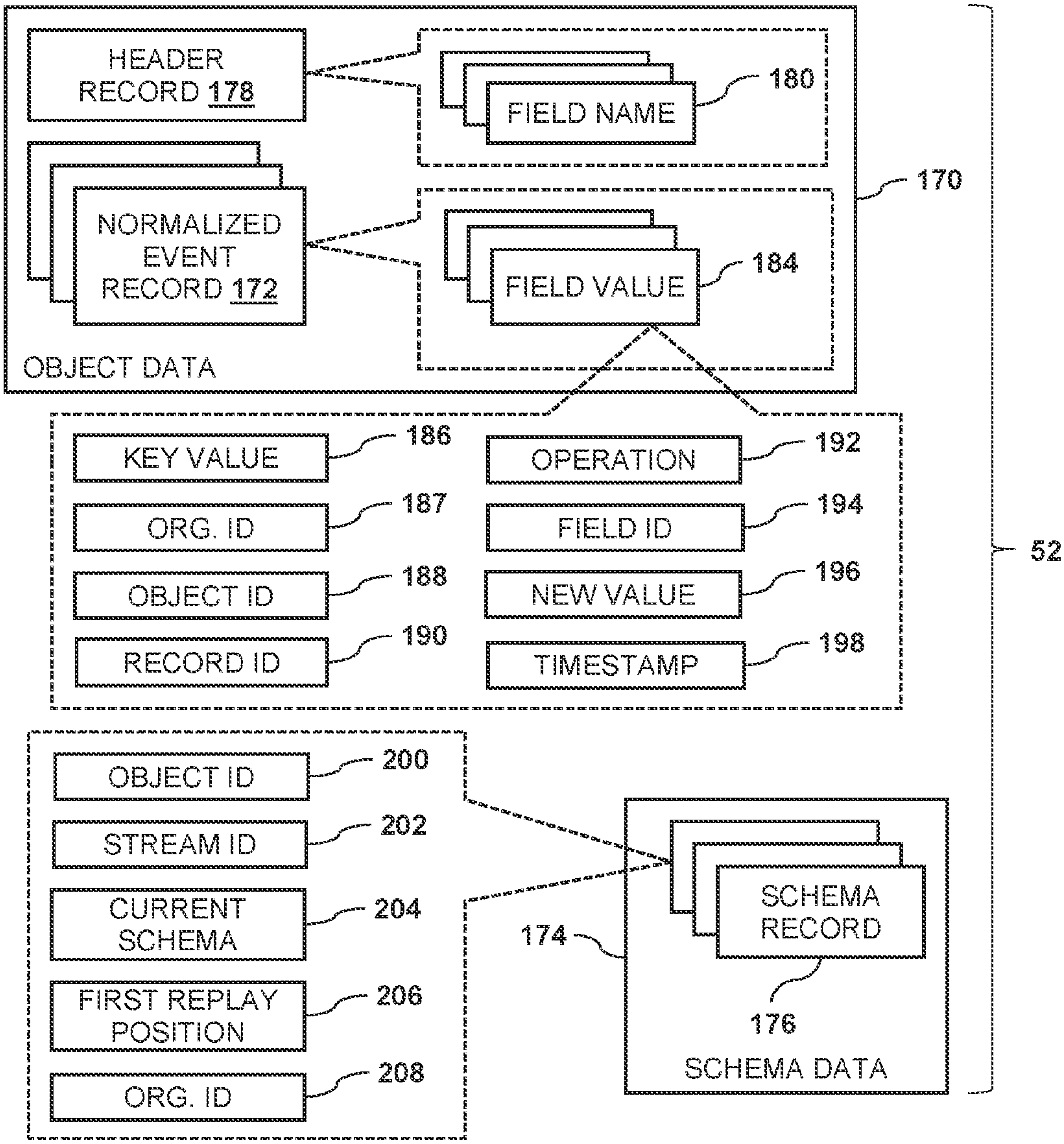
FIG. 6 is a block diagram that shows an example of data components of a given journal file, in accordance with an embodiment of the present invention.

FIG. 6 is a block diagram showing data components of each given raw journal 52, in accordance with an embodiment of the present invention. In embodiments described herein, processor 34 can generate a given raw journal using data stored normalized events 46.

Each given raw journal 52 may comprise an object data File 170 (also referred to herein simply as object data 170) that comprises a set of normalized event records 172, and a schema data file 171 (also referred to herein simply as schema data 174) that comprises a set of schema records 176. As described hereinbelow, each record 172 references a corresponding data update (e.g., a given normalized event 16) to a given object value 106 and each schema record 176 references a corresponding update to schema 102 of a given CRM object 98.

In some embodiments, object data 170 may comprise a structured text files such as a comma-separated (CSV) file, and schema data 174 comprises a semi-structured data file, such as a JSON file. In embodiments where object data comprises a CSV file, object data 170 comprises a header record 178 that comprises multiple field names 180, and a plurality of normalized event records 112 that comprise a corresponding multiple (i.e., to the field names) of field values 180. Field values 184 in each given normalized event record 172 may comprise:

A key value 186. Processor 34 can generate and store a unique key value 186.

An organization ID 187. In some instances, snapshot server 20 may manage event stream 40, journals 42 and snapshots 22 for multiple organizations (e.g., corporate clients). In these instances, processor 34 can store respective identifiers to TD 187 so as to differentiate the normalized event records in the journals.

An object ID 188. Processor 34 can store, to object ID 188, object ID 154 in the corresponding raw event. In a first embodiment, processor 34 can store, a single raw journal 52, all updates to CRM database 30 subsequent to the most recent snapshot 22A. In the first embodiment, field values 184 may comprise object ID 188. In a second embodiment, processor 34 can store updates to each given CRM object 98 to separate respective journals 52. In the second embodiment, field values 184 may not need to include object ID 188.

A record ID 190. Processor 34 can store, to record ID 190 record ID 156 in the corresponding normalized event.

An operation 192. Processor 31 can store, to operation 192, operation 158 in the corresponding normalized event.

A field ID 194 and a new value 196. Processor 31 can respectively store, to field ID 194 and new value 196, field ID 162 and new value 164 from given data change 160 in the corresponding normalized event. In instances where the corresponding normalized event comprises multiple data changes 160, processor 34 can generate separate respective normalized event records 172 for each data change 160. In some embodiments, if new value 196 replaces an existing value in the object field referenced by field ID 194, normalized event record 172 may also store the replaced value (not shown).

A timestamp 198. Processor 34 can store, to timestamp 198, timestamp 146 in the corresponding normalized event.

In this configuration of object data file 170 shown in FIG. 6, each individual update to any given object record 100 has a corresponding normalized event record 172. For example:

If operation 153 for a given record ID 156 in a given normalized event 46 indicates a deletion of the object record corresponding to the given record ID, then processor 34 can generate a single normalized event record 172 for the record deletion.

If operation 153 for a given record ID 156 in a given normalized event 16 indicates an update of one or more object fields 104 in the object record corresponding to the given record ID, then processor 34 can generate a corresponding number of normalized event records 172 (i.e., a corresponding normalized event record 172 for each updated object field 104).

If operation 158 for a given record ID 156 in a given normalized event 46 indicates a new added object record 100 corresponding to the given record ID, then processor 34 can generate new normalized event record 172 for each object field 104 in the added object record.

Therefore, processor 34 can create one or more normalized event records 172 for each normalized event 46.

Schema data file 174 may comprise one or more schema records 176 that may comprise:

- An object ID 200. Processor 34 can store a reference to a given CRM object to object ID 200.
- A stream ID 202. Processor 34 can store, to stream ID 202, a reference (e.g., a file name and location) to the normalized event stream corresponding to raw journal 52.
- A current schema 204 and a first replay position 206. While generating journal 52, if there is any update to schema 102 for the CRM object referenced by object ID 100, processor 34 can store the updated schema to current schema 204, and store, to first replay position 206, key value 186 for the first normalized event record 172 subsequent to the schema update. In some embodiments, processor 34 can initializes schema data file 174 by storing all schemas 102 to respective schema records 176 when initiating the process of generating raw journal 52.
- An organization ID 208. This Is similar to organization ID 187 described supra, and therefore enables processor 34 to track changes made to schemas 102 of different CRM objects 98 for different organizations.

Figure 7:
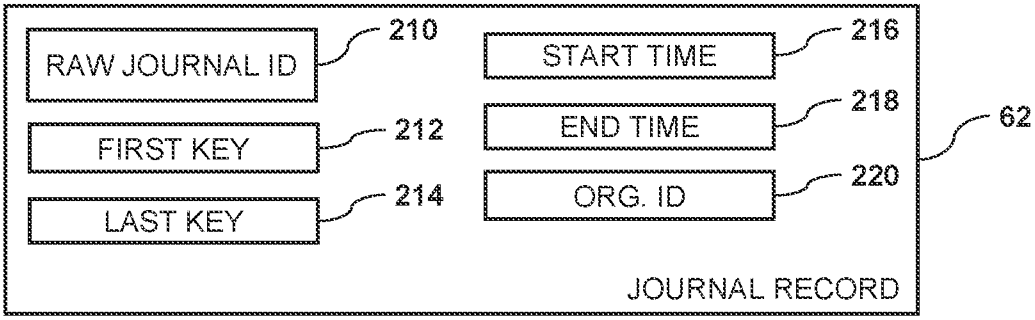
FIG. 7 is a block diagram that shows an example of data components of a journal record that stores information for a given journal, in accordance with an embodiment of the present invention.

FIG. 7 is a block diagram showing an example of a journal record 62, in accordance with an embodiment of the present invention. As described in the description referencing FIG. 1 hereinabove, memory 36 can store journal table 58 comprising journal records 62.

In the configuration shown in FIG. 7, processor 34 can define, for each given journal 52, a corresponding journal record 62 that can store information such as:

- A raw journal ID 210. Processor 34 can store a reference to the given raw journal in ID 210.
- A first key 212 and a last key 214. As described supra, each normalized event record 172 may store a respective key value 186. In some embodiments, processor 34 can store, in corresponding journal record 62, the lowest key value in the given journal a to first key 212 and the highest key value in the given journal to last key 214.
- A start time 216 and an end time 218. For a given journal partition 54, processor 34 can identify the earliest and latest timestamps (i.e., comprising respective dates and times) 198 in the given journal, and store, to the corresponding journal record 62, the earliest timestamp to start time 216, and the latest timestamp to end time 218.
- An organization ID 220. This is similar to organization ID 187 described supra, and therefore enables processor 34 to track journals 42 of different CRM objects 98 for different organizations.

Figure 8:
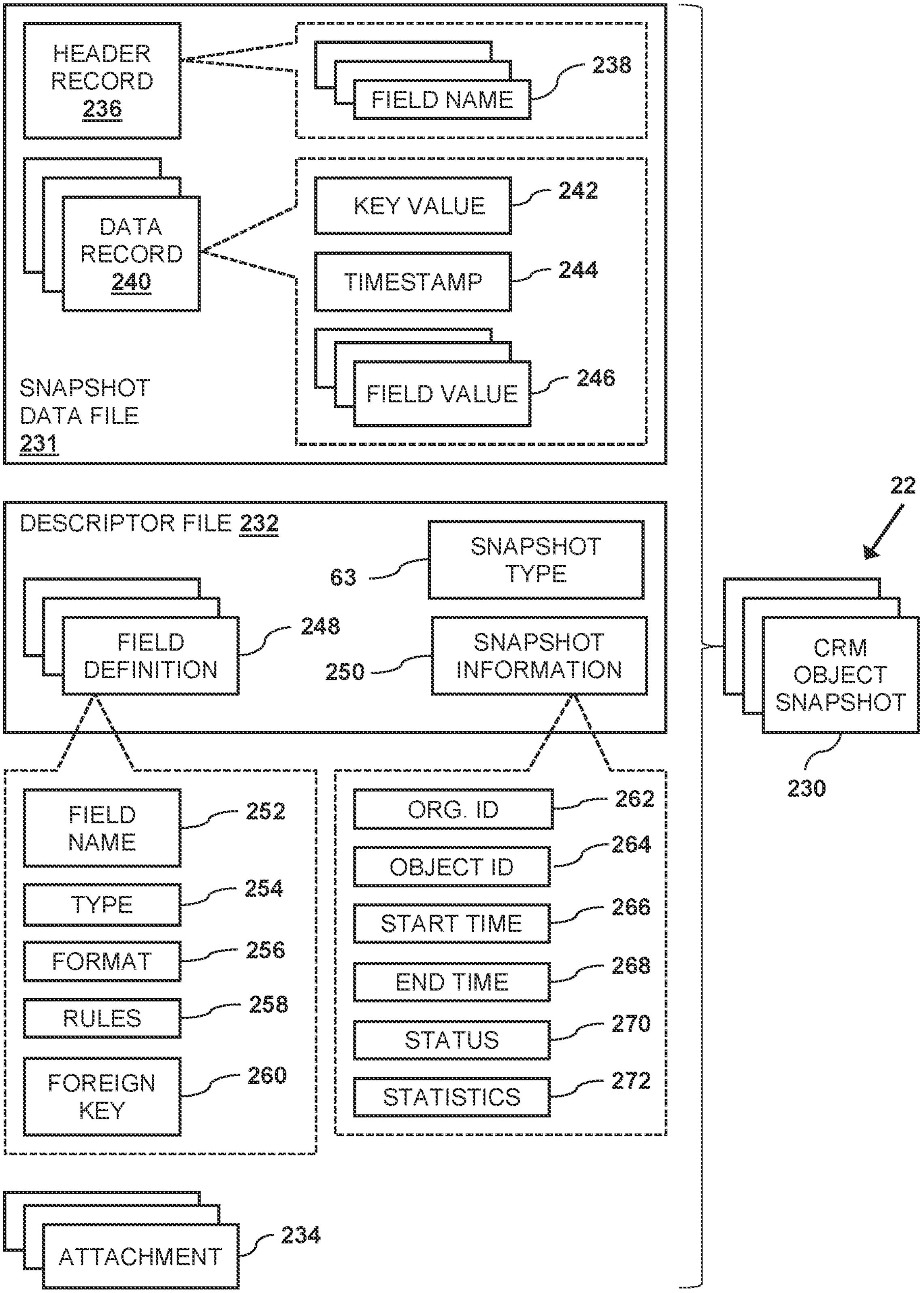
FIG. 8 is a block diagram that shows an example of data components of a given snapshot, in accordance with a first embodiment of the present invention.

FIG. 8 is a block diagram that shows data components of a given snapshot 22 of CRM database 30, in accordance with a first embodiment of the present invention. As described supra, a given snapshot comprises a read-only, static view of CRM database 30 at a specific time. In embodiments described herein, processor 34 can create a custom snapshot 22B by identifying the most recent previous periodic snapshot 22A prior to the specified time, and updating the identified periodic snapshot with any updates that the snapshot processor can identify, in journals 42, that transpired subsequent to the time that the identified snapshot was created and prior to the specified time.

In the configuration shown in FIG. 8, each given snapshot 22 may comprise a set of CRM object snapshots 230, wherein each of the CRM object snapshots corresponds to a given CRM object 98. Each CRM object snapshot 230 may comprise a snapshot data file 231 that stores values 106 from object records 100 in a corresponding CRM object 98, and an associated descriptor file 232 that stores metadata/configuration information about the given snapshot, and any attachments 234 referenced by the given snapshot. Examples of attachments 231 include, but are not limited to, binary large object (BLOB) files and base 64 files.

In some embodiments, processor 34 can store data snapshot files 231 as CSV files. In these embodiments a given data snapshot file 231 may comprise a header record 236 comprising a set of field names 238, and a set of data records 240. Each given data record 240 can store information such as:

- A key value 242. Processor 34 can generate a unique value for each data record 240 and store the generated values to key values 242.
- A timestamp 244. Each data record 240 corresponds to a given object record 100, and time stamp 214 indicates the date and time of most recent update to any object value 106 in the given object record.
- A set of field values 246. Processor 34 can store the object values in the corresponding object record to field values 246.

In some embodiments, processor 34 can store descriptor files 232 as a semi-structured data file, such as JSON files. In these embodiments, each given descriptor file 232 may comprise a snapshot type 63 (e.g., Monthly, Weekly, Daily or Custom, as described supra), a set of field definitions 248 and snapshot information 250.

In some embodiments (as described supra), snapshot management application 38 may store snapshots 22 as CSV files. In these embodiments, each data record 240 comprises a set of field values 246, and the field definitions 248 may have a one-to-one correspondence with the field values 246 for the data records. For example, if each data record 240 comprises nine yield values 246, then descriptor file 232 can store nine corresponding field definitions 248. Each given field definition 238 can store information such as:

- A field name 252 for the corresponding field value.
- A field type 254 (e.g., text, numeric, date) for the corresponding field value.
- A field format 256 that can store any formatting information for the corresponding field value.
- One or more rules 258 that can store any validation rules for the corresponding field value.
- Foreign key information 260. In some embodiments the corresponding field value stored in a first object record 100 in a first CRM object 98 may comprise a key value (i.e., a pointer) to a second object record 100 in a second CRM object 98. In these embodiments, processor 34 can store, to foreign key information 260, the mapping information to the second object record.

In embodiments of the present invention, a system administrator (not shown) may select either a subset or all object fields 104 to include in its corresponding CRM object snapshot 230. In the first embodiment presented in FIG. 8, field values 246 in each CRM object snapshot 230 comprises all object values 106 for the selected object fields.

For a given CRM object snapshot 230, information that processor 34 can store to snapshot information 250 may include:

- An organization ID 262. This is similar to organization ID 187 described supra, and therefore enables processor 34 to track CRM object snapshots 230 of different CRM objects 98 for different organizations.

- An object ID 264 that references a given CRM object 98.
- A start time 266 that indicates a date and time that processor 34 started to create the given CRM snapshot.
- An end time 268 that indicates a date and time that processor 34 completed the given CRM snapshot. End time 268 may also be referred to herein as a creation date for the given CRM snapshot.
- A status 270 for the given CRM snapshot. For example, status 270 can indicate whether or not processor 34 successfully completed generating the given CRM snapshot.
- Statistics 272 that can indicate, for the given CRM snapshot, information such as how many calls to API 96 were requires, and how many data records 210 are in the given CRM snapshot.

Figure 9:
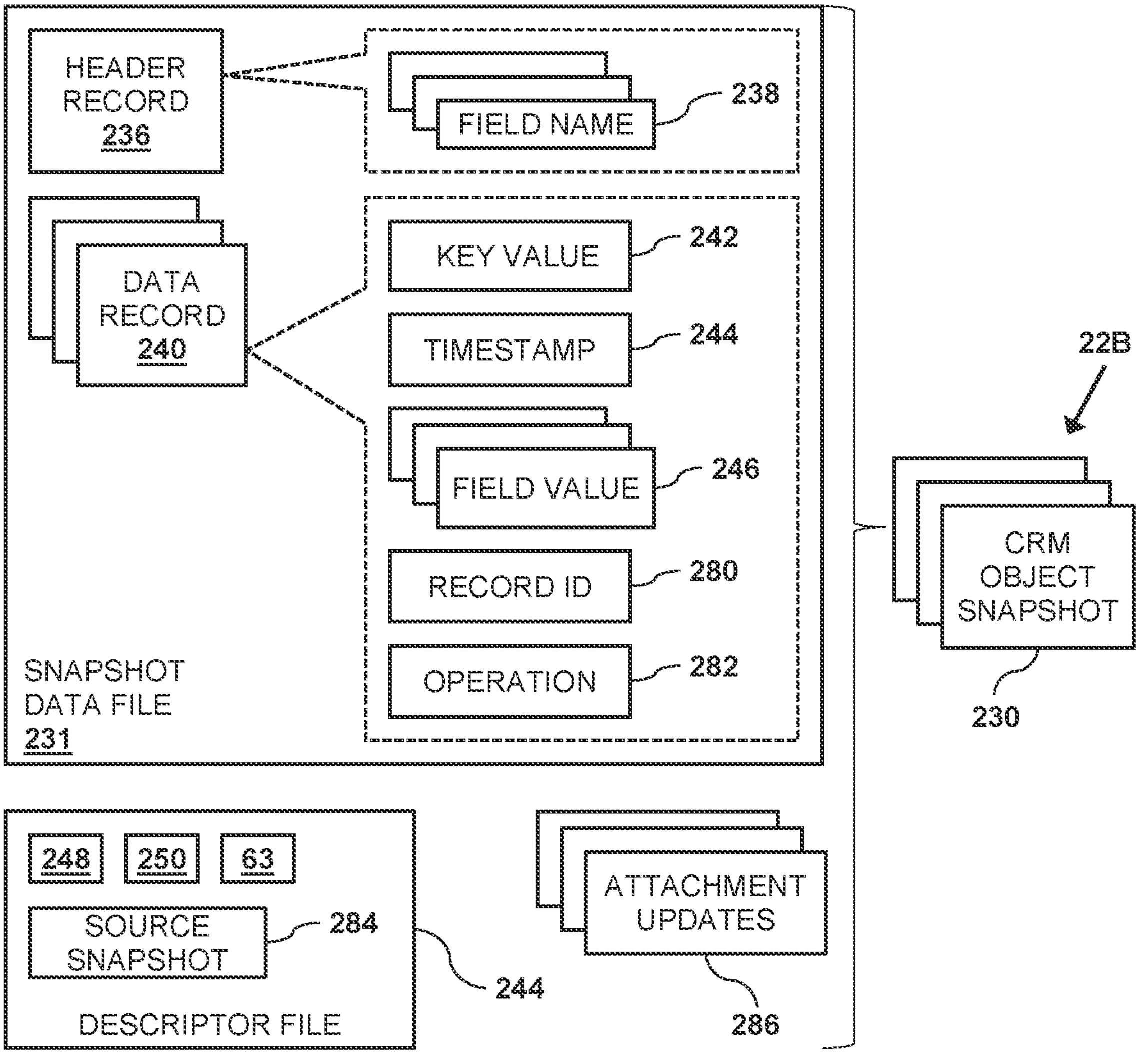
FIG. 9 is a block diagram that shows an example of data components of a given snapshot, in accordance with a second embodiment of the present invention.

FIG. 9 is a block diagram that shows data components of a given snapshot 22B of CRM database 30, in accordance with a second embodiment of the present invention. In the second embodiment, snapshot data file 231 stores a set of updates to CRM database 30 subsequent to a given periodic snapshot 22A. Using the given periodic snapshot (also referred to herein as the base snapshot) and the set of updates stored in snapshot data file 231, snapshot management application 38 can present custom snapshot 22B as a "virtual snapshot" that the snapshot management application can generate on an as-needed basis.

In the second embodiment, each data record 240 may additionally comprise a record ID 280 and an operation 282. Record ID 280 references a given object record 100, and operation 282 references a given operation that CRM application 94 performed on the given object record. Examples of these operations include adding a new object record 100, updating the given object record or deleting the given object record.

If operation ID 282 in a given data record 240 indicates a new object record 100, then processor 34 can store values 106 for the new object record to field values 246 in the given data record. Similarly, if operation ID 282 in a given data record 240 indicates updating a given record 100, then processor 34 can store values 106 for the updated object record to field values 246 in the given data record. However, if operation ID 282 in a given data record 240 indicates a deleted record 100, then processor 34 does not need to store any values 106 for the deleted object record to field values 246 in the given data record.

In the second embodiment, descriptor file 232 may also comprise a source snapshot ID 234 that references the base snapshot 22A, and snapshot 22A may also comprise any updates 286 to attachments 234.

Figure 10:
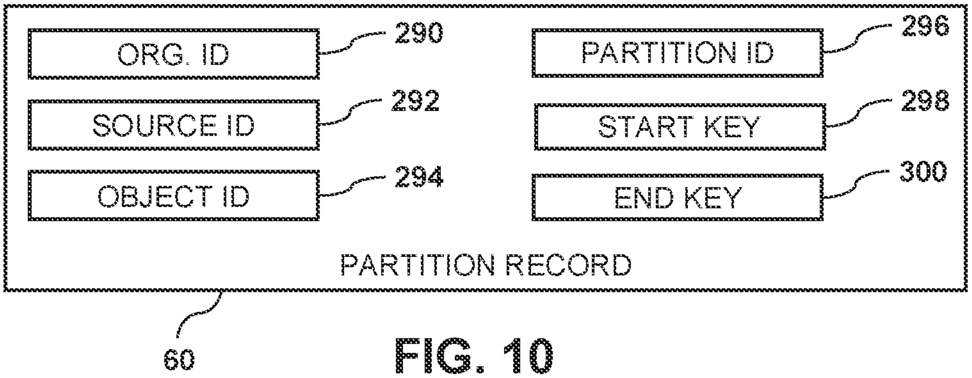
FIG. 10 is a block diagram that shows data components of a partition record that can store information enabling partitioning of a given journal or a given snapshot, in accordance with an embodiment of the present invention.

FIG. 10 is a block diagram that shows data components of a given partition record 60, in accordance with an embodiment of the present invention. In embodiments described herein, processor 34 can partition a given raw journal 52 into a set of journal partitions 54, and can partition a given raw snapshot 43 into a set of snapshot partitions 50. In these embodiments, the journal partitions for a given raw journal 52 comprise respective disjoint subsets of normalized event records 172 in the given raw journal. Likewise, the snapshot partitions for a given raw snapshot 48 comprise respective disjoint subsets of data records 240 in the given raw snapshot.

In some instances, a given raw journal 52 or a given raw snapshot 48 may be too large (i.e., in size) for snapshot management application 38 to manage and access efficiently. In these embodiments, processor 34 can partition the given raw journal or the given raw snapshot into a set of smaller journal partitions 54 that may comprise respective disjoint subsets of the data records in the given raw journal. In some embodiments, processor 34 can store the partitioning parameters to partition records 60.

In the configuration shown in FIG. 10, processor 34 can generate respective partition records 60 for each journal partition 54 and snapshot partition 50, and store, to each given partition record 60, information such as:

- An organization ID 290. This is similar to organization ID 187 described supra, and therefore enables processor 34 to track partitions 50 and 54 for different organizations.
- A source ID 292 that references a given raw journal 52 or a given raw snapshot 48.
- An object ID 294 that references a given CRM object 93.
- A partition ID 296 that references a given journal partition 54 comprising a disjoint subset of the given raw journal or a given snapshot partition 50 comprising a disjoint subset of the given raw snapshot.
- A start key 298. If partition ID 296 references a given journal partition 54, then start key 298 comprises the lowest key value 186 in the given journal partition. If partition ID 296 references a given snapshot partition 50, then start key 298 comprises the lowest key value 242 in the given snapshot partition.
- An end key 300. If partition ID 296 references a given journal partition 54, then end key 300 comprises the highest key value 186 in the given journal partition. If partition ID 296 references a given snapshot partition 50, then end key 300 comprises the highest key value 242 in the given snapshot partition.

Periodic Snapshot Creation

Figure 11:
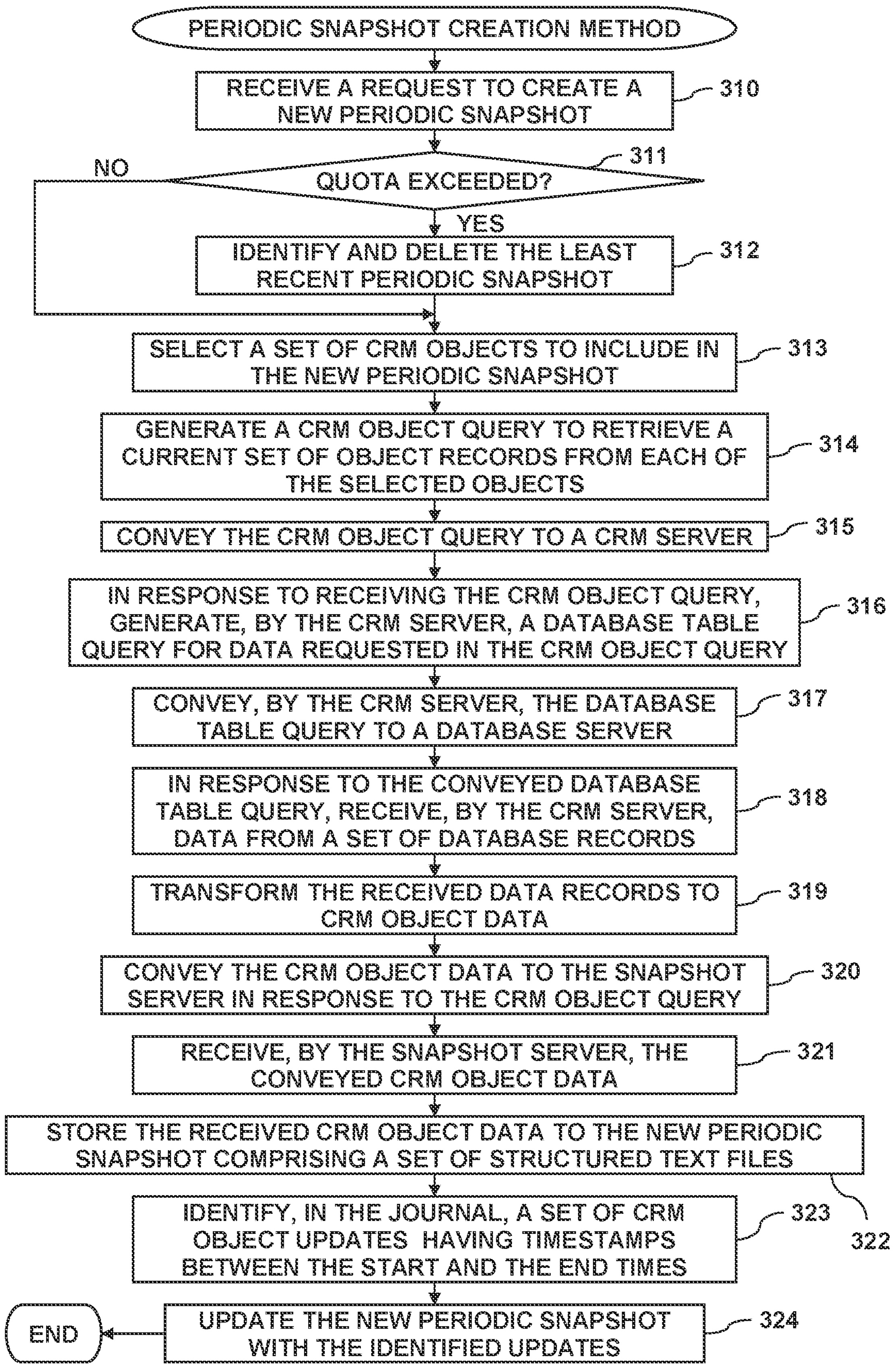
FIG. 11 is a flow diagram that schematically illustrates a method of generating a given periodic snapshot, in accordance with an embodiment of the present invention.
Figure 12:
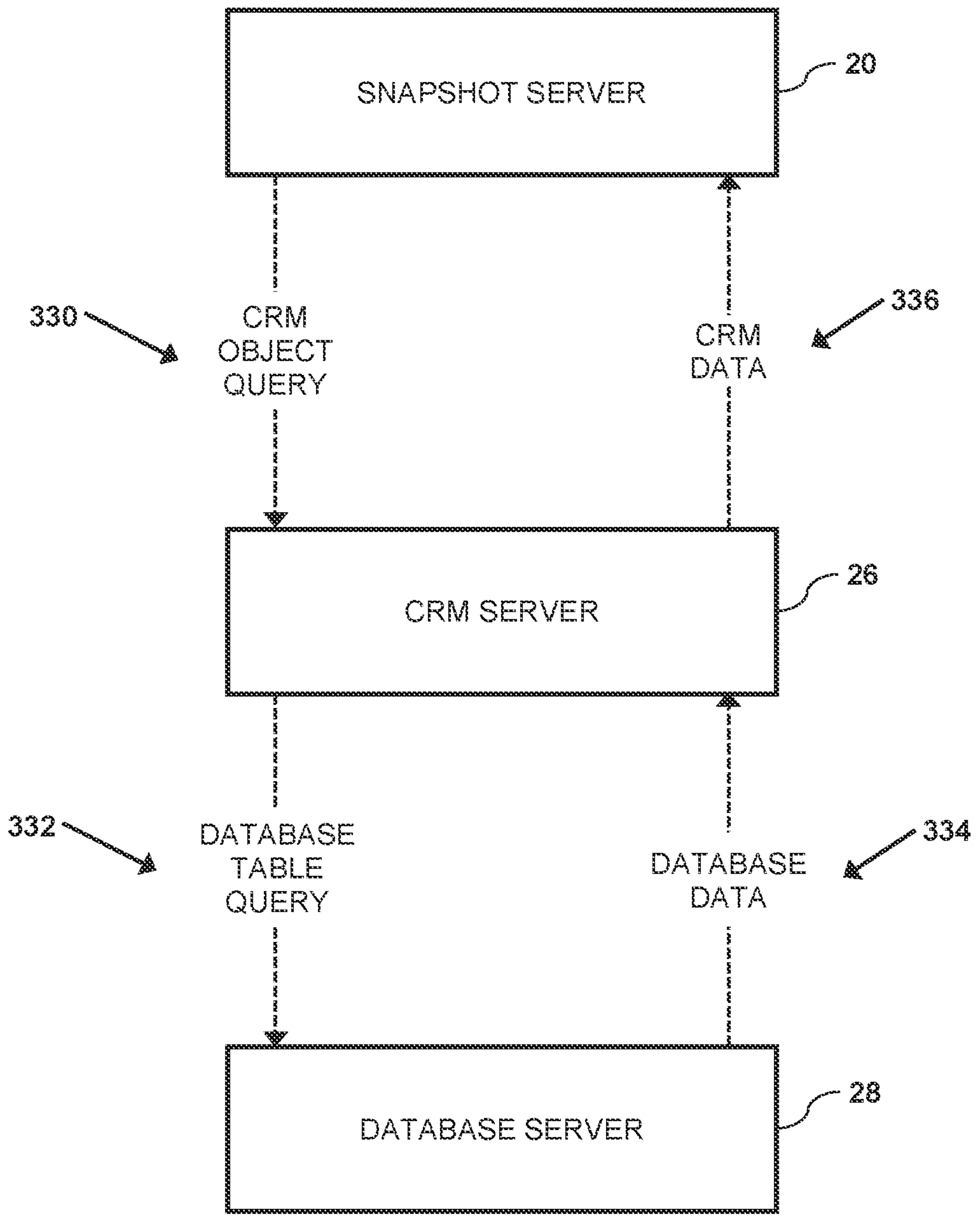
FIG. 12 is a block diagram that schematically illustrates data flowing between the snapshot server, the CRM server and the database server, in accordance with an embodiment of the present invention.

FIG. 11 is a flow diagram that schematically illustrates a method of generating a new periodic snapshot 22A, and FIG. 12 is a block diagram that shows an example of data flows between snapshot server 20 and CRM server 26, and between the CRM server and database server 28, in accordance with an embodiment of the present invention.

In step 310, processor 34 receives a request to create a new periodic snapshot 22A. In some embodiments, the request includes snapshot type 63 such as Monthly, Weekly or Daily.

In step 311, processor 34 compares the received snapshot type to the snapshot frequencies so as to identify a given quota definition 64 whose snapshot frequency 66 matches the received snapshot type. In an embodiment where the snapshot quota comprises a maximum number of snapshots 22, processor 34 can increment (by one) she snapshot count in the given quota definition, and compare she incremented snapshot count to the snapshot quota in the given quota definition.

In this embodiment, if the incremented snapshot count exceeds the snapshot count in the given quota definition, then in step 312, processor 34 can identify the earliest snapshot 22 having a matching snapshot type 34 (i.e., given snapshot whose type 63 matches the received snapshot type and whose end time 268 is earlier than the creation date of the remaining snapshots having the same snapshot type 63), and delete the identified earliest snapshot.

In step 313, processor 34 selects (e.g., in response to user input or a definition stored in memory 36) a set of CRM objects 98 to include in the new periodic snapshot. In some embodiments, processor 34 can also select a set of object fields 104 for each of the selected CRM objects (i.e., either all or a subset of the object fields in the a selected CRM objects).

Returning to 311, if the incremented snapshot count does not exceed the snapshot count in the given quota definition, then the method continues with step 313.

In embodiments where the snapshot quota comprises a time period (e.g., 6 months) processor 34 can periodically analyze snapshots 22 so as to identify and delete any of the snapshots whose time period (i.e., based on the snapshot, types, the snapshot frequencies, the snapshot quotas and a current date/time).

In step 314, processor 34 generates a CRM object query 330 (FIG. 12) that comprises a request to retrieve current sets of object records 100 (i.e., the selected felids in some embodiments) in each of the selected CRM objects. In some embodiments query 330 may comprise one or more calls to API 96.

In step 315, processor 34 conveys CRM object query 330 to CRM server 26 via network 24.

In step 316, processor 90 receives CRM object query 330, and upon receiving the CRM object query, the CRM processor can generate a database table query 332 comprising a request for database records 78 that store data for object records requested in CRM object query 330. In some embodiments, processor 90 can generate database table query 332 by using schemas 102 so map between object fields 104 and database fields 80.

In step 317, processor 90 conveys database query 332 to database server 28 via network 24. Upon processor 70 receiving database query 332, the database processor executes DBMS application 74 to process the database query so as to generate a database query response comprising database data 334. Database data 334 comprises values 82 from a set of database records 78. Upon processing database query 332, processor 70 conveys database data 334 to CRM server 26 via network 24.

In step 318, processor 90 receives database data 334 (i.e., in response to conveying database query 332).

In step 319 upon receiving database data 334, processor 90 transforms database values 82 in database data 334 into object values 106. Similar to embodiments described in the description referencing step 317 hereinabove, processor 90 can use the mappings in schemas 102 co transform database values 82 in database data 334 into object values 106.

In step 320, processor 90 conveys, to snapshot server 22 via network 24, CRM data 336 comprising transformed object values. CRM data 336 comprises a response to CRM object query 330.

In step 321, processor 34 receives the conveyed CRM data 336.

In step 322, processor 34 uses the received CRM data to generate the new periodic snapshot. In some embodiments, processor 34 can use embodiments described herein above to partition the generated periodic snapshot into a set of snapshot partitions 50. Additionally, processor 30 can compute and store snapshot information 250 for the generated periodic snapshot using embodiments described hereinabove.

In step 323, processor 34 identifies any updates (i.e., normalized event records 172) whose timestamps are (a) greater than or equal to the start time 266 of the new periodic snapshot and (b) less than or equal to the end time 268 of the new periodic snapshot.

Finally, in step 324, processor 34 updates the new periodic snapshot with the updates identified in step 323, and the method ends. By performing steps 323 and 324, processor 34 ensures that the new period snapshot is a transactionally consistent backup of database 32.

Journal Creation

Figure 13:
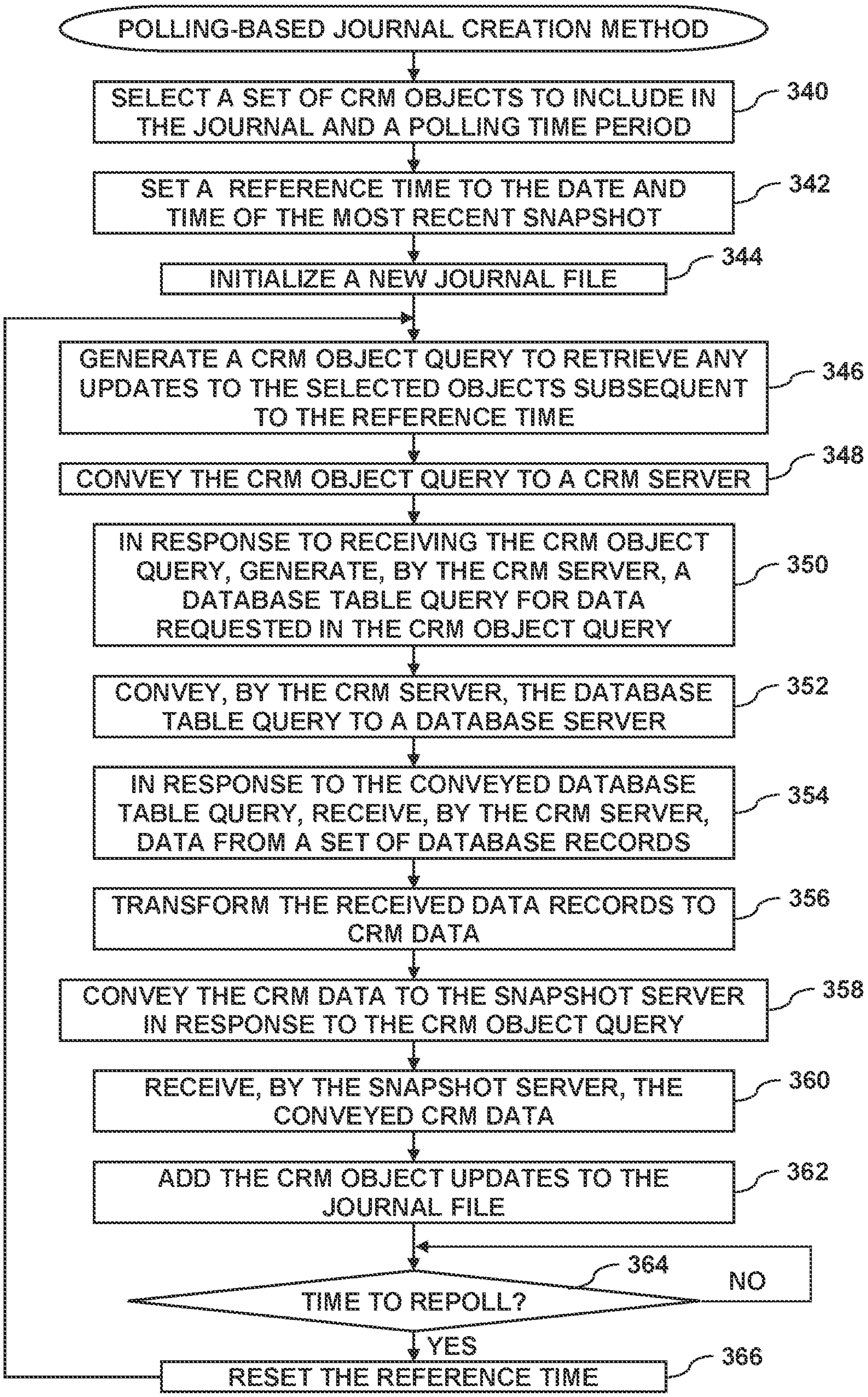
FIG. 13 is a flow diagram that schematically illustrates a method of generating a given journal, in accordance with a first embodiment of the present invention.

FIG. 13 is a flow diagram that schematically illustrates a method of generating a given journal 42, in accordance with a first embodiment of the present invention. In the first embodiment, processor 34 periodically polls CRM server 26 for any changes to CRM database 30.

In step 340 processor 34 selects a set of CRM objects 98, and specifies a polling time period. For example, processor 34 may specify the polling time period as ten minutes. In some embodiments (similar to the description referencing step 310 hereinabove), processor 34 can select respective sets of object fields 101 in the selected CRM objects.

In step 342, processor 34 identifies the most recent previous snapshot 22A, and sets a reference time to end time 268 in the identified periodic snapshot.

In step 344 processor 34 initializes a new journal 42 by creating a new (and empty) raw journal 52.

In step 346, processor 34 generates a new CRM object query 330. The new CRM object query may comprise one or more calls to API 96 that instructs CRM application 94 to convey, to snapshot server 20, any updates to the selected CRM objects (and the selected object fields, if they were selected in step 340) subsequent to the reference time.

In step 348, processor 34 conveys the new CRM object query to CRM server 26 via network 24.

In step 350, processor 90 receives the conveyed CRM query, and using embodiments described hereinabove, generates a new database table query 332 for data requested in the received CRM object query.

In step 352, processor 90 conveys the new database table query to database server 28 via network 24. Upon processor 70 receiving the conveyed database query DBMS application 74 executes the database query on database 32 (i.e., to retrieve any updates to any database table 76 subsequent to the reference time. The result of the query typically comprises a set of database values that processor 70 can convey to CRM server 26 (via network 24) in database data 334.

In step 354, processor 90 receives database data 334, that database server conveyed in response to receiving and executing database table query 332.

In step 356, processor 90 transforms database data 334 to CRM data 336, e.g., using schema 102, as described supra.

In step 358, processor 90 conveys CRM data 336 to snapshot server 20 in response to receiving and processing CRM object query 330.

In step 360, processor 34 receives CRM data 336 comprising a response to CRM object query 330. In step 362 CRM data 336 comprises one or more events 44.

In step 362, processor 34 normalizes the received events (i.e., in CRM data 336) into normalized events 46 and adds the normalized events to journal 42. For each given new normalized stream event 46 that updates a given object record 100, processor 34 can add, for each data change 164, a new normalized event record 172 in a given object data file 170 (i.e., the object data file storing updates for the CRM object referenced by object ID 154 in the given normalized stream event), and copy the field values in the new normalized event records with new values 164 in the given normalized event 46.

Likewise, for each given new normalized event 46 that adds a new object record 100, processor 34 can add new normalized event records 172 in a given object data file 170 (i.e., the object data file storing updates for the CRM object referenced by object ID 154 in the given normalized stream event), and copy the field new values 164 in the given normalized event 46 to the field values in the new normalized event records.

In step 364, processor 34 waits until the specified polling time period has elapsed since the reference time. Upon detecting that the specified polling time period has elapsed since the reference time, processor 34 resets the reference time to the current time in step 366, and the method continues with step 346.

In some embodiments, processor 34 can partition the given periodic snapshot into multiple snapshot partitions 50 using embodiments described hereinabove.

Figure 14:
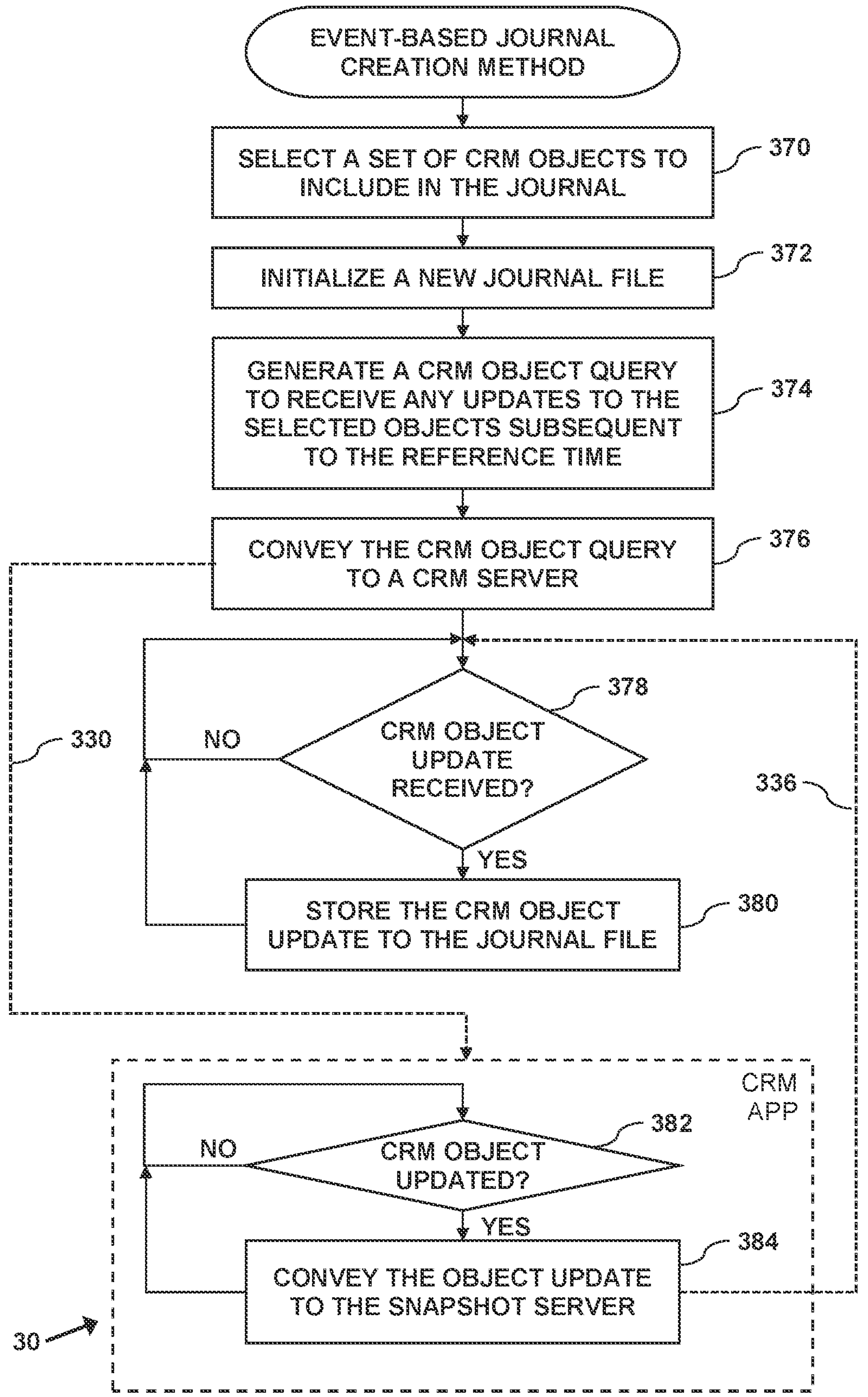
FIG. 14 is a flow diagram that schematically illustrates a method of generating a given journal, in accordance wish a second embodiment of the present invention.

FIG. 14 is a flow diagram that schematically illustrates a method of generating a given journal 42, in accordance with a second embodiment of the present invention. In the first embodiment, processor 34 receives, from CRM server 26, any changes to CRM database 30 as they occur.

In step 370 processor 34 selects a set of CRM objects 98.

In step 372, processor 34 identifies the most recent previous snapshot 22A, and initializes a new journal 42 by creating a new (and empty) raw journal 52.

In step 374, processor 34 generates a new CRM object query 330. The new CRM object query may comprise one calls to API 96 that instructs CRM application 94 to convey, to snapshot server 20, any updates to the selected. CRM objects upon their occurrence.

In step 376, processor 34 conveys the new CRM object query to CRM server 26.

In step 378, processor 34 waits to receive CRM data 336 that comprises one or more events 44.

In step 380, upon receiving event (s) 44, processor 34, using embodiments described in the description referencing FIG. 13 hereinabove, normalizes the received event(s), and stores the normalized event(s) to the new raw journal. Upon completing step 380, the method continues with step 378.

Upon receiving CRM object query 330 (that was conveyed in step 376), processor 90 waits, in step 382, until it detects a update for a given CRM object 98.

Finally, in step 384, processor 90 conveys the detected update to snapshot server 20, and the method continues with step 382.

Snapshot Creation

Figure 15:
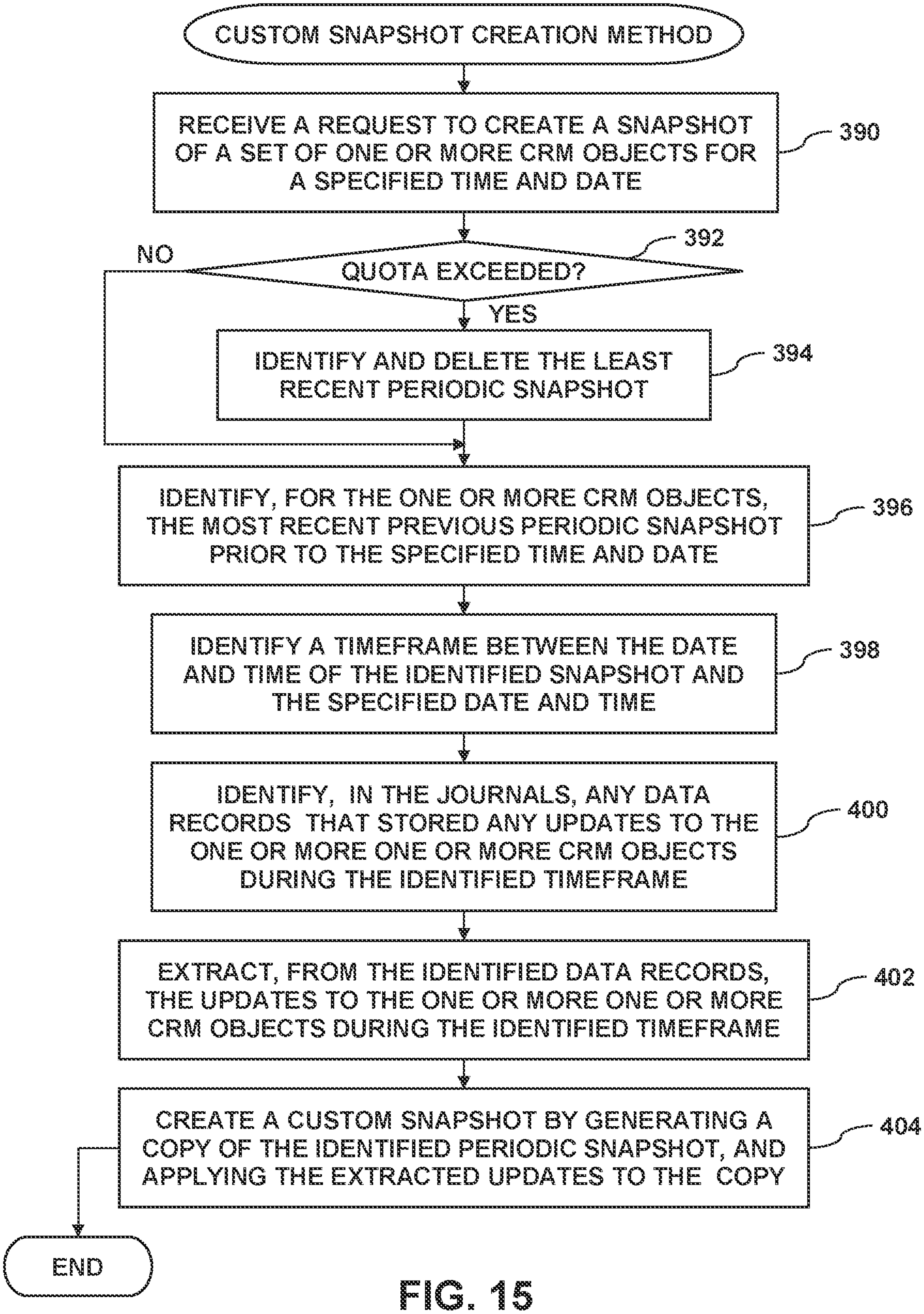
FIG. 15 is a flow diagram that schematically illustrates a method of generating the custom snapshot, in accordance with an embodiment of the present invention.

FIG. 15 is a flow diagram that schematically illustrates a method of generating a custom snapshot 22B, in accordance with a first embodiment of the present invention.

In step 390, processor 34 receives a request to create a new custom snapshot 22B, of a set of one or more CRM objects 98 for a specified date and time. In embodiments herein the snapshot type of the new snapshot is Custom.

In step 392, processor 34 analyses the snapshot frequencies so as to identify a given quota definition 64 whose snapshot frequency 66 comprises Custom. In an embodiment where the snapshot quota comprises a maximum number of snapshots 22, processor 34 can increment (by one) the snapshot count in the given quota definition, and compare the incremented snapshot count to the snapshot quota in the given quota definition.

If the incremented snapshot count exceeds the snapshot count in the given quota definition, then in step 394, processor 34 can identify the earliest snapshot 22 having a matching snapshot type 34 (i.e., given snapshot whose snapshot type 63 comprises Custom and whose end time 268 is earlier than the creation date of the remaining snapshots whose snapshot types also comprise Custom), and delete the identified earliest snapshot.

In step 396, processor 34 identifies, for the set of CRM objects 98, the most recent previous periodic snapshot 22A that processor 34 generated prior to the specified date and time. For example (for simplicity only date is used in this example), if periodic snapshots exist for January 5, January 12, January 19 and January 26, and the specified date is January 14, then the date of the most recent previous periodic snapshot 22A is January 12.

Returning to step 392, if the incremented snapshot count does not exceed the snapshot count in the given quota definition, then the method continues with step 396.

In step 398, processor 34 identifies a timeframe between the date and time of the identified periodic snapshot and the specified date and time.

In step 400, processor 34 identifies any normalized event records 172 in journals 42 that comprise field values 184 having timestamps 198 during the identified timeframe. The field values 184 having timestamps 198 during the identified timeframe correspond to respective updates to one or more CRM objects 98 during the timeframe identified in step 398.

In step 102, processor 32 extracts, from the identified normalized event records, the updates to one or more CRM objects 98 (e.g., one or more object fields 104 in one or more object records 100 in the to one or more CRM objects) during the timeframe identified in step 398.

Finally, in step 404, processor 34 creates the new custom snapshot by generating a copy of the periodic snapshot 22A the processor identified in step 396, applies the updates (identified in step 402) in the identified normalized event records to the copy (i.e., the new custom snapshot), and the method ends. For example:

- If a given update comprises a given normalized event record 172 whose operation 192 indicates a deletion of a given object record 100, then processor 34 can delete, from the new custom snapshot, the data record corresponding to the deleted object record. In some instances, the deleted object record may comprise a parent record of one or more other data records 240. In these instances, processor 34 can use information stored in descriptor files 232 and/or schema data 174 to identify and delete the children records.
- If a given update comprises multiple normalized event records 172 whose operation 192 indicates an addition of a new object record 100 (i.e., the one or more data records are for the same new object record 100), then processor 34 can add, to the new custom snapshot, a new data record 240 and populate the new data record with field values 184 from the multiple data records.
- If a given update comprises one or more normalized event records 172 whose operation 192 indicates an update of a single given object record 100 (i.e., the one or more data records are for the same object record 100), then processor 34 can apply, to the data record in the new custom, snapshot corresponding to the given object record, the updates in the one or more data records.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for use with a database comprising multiple tables, comprising:

during a time period beginning with a first time and ending with a second time, copying the database to a file;

receiving, from a software system managing the database, updates made to the tables during the time period, and storing the received updates to a journal including a raw journal and a set of journal partitions into which the raw journal is split; and by accessing a set of partition records, which specify a lowest key value and a highest key value in each of the journal partitions:

identifying, in the journal, a set of the updates not stored in the file; and updating the file, by a processor, with the set of the updates so that the file comprises a transactionally consistent backup of the database.

2. The method according to claim 1, wherein the journal and the file comprise respective structured text files.

3. The method according to claim 2, wherein the structured text files comprise comma-separated value (CSV) files.

4. The method according to claim 1, wherein the journal and the file comprise respective binary files.

5. The method according to claim 1, wherein the journal comprises one or more JavaScript Object Notation (JSON) files.

6. The method according to claim 1, further comprising generating and conveying, to the software system, queries that request the updates, wherein receiving the updates comprises receiving the updates by receiving responses to the queries that include the updates.

7. The method according to claim 6, wherein generating and conveying the queries comprises generating and conveying the queries during the time period.

8. The method according to claim 6, wherein generating and conveying the queries comprises periodically generating and conveying the queries.

9. The method according to claim 6, wherein the software system comprises a customer relationship management (CRM) application, and wherein the queries comprise calls to an application programming interface (API) of the CRM application.

10. The method according to claim 9, wherein the tables comprise respective sets of fields, and wherein a given response comprises a plurality of updates to one or more of the fields in one or more of the tables.

11. An apparatus for use with a database comprising multiple tables, comprising:

a memory, configured to store;

a journal including a raw journal and a set of journal partitions into which the raw journal is split, and a set of partition records, which specify a lowest key value and a highest key value in each of the journal partitions; and one or more processors configured:

to copy the database, during a time period beginning with a first time and ending with a second time, to a file, to receive, from a software system managing the database, updates made to the tables during the time period, and to store the received updates to the journal, and by accessing the set of partition records:

to identify, in the journal, a set of the updates not stored in the file, and to update the file with the set of the updates so that the file comprises a transactionally consistent backup of the database.

12. A computer software product comprising a tangible non-transitory computer-readable medium in which program instructions are stored, which instructions, when read by one or more processors, cause the processors:

to copy to a file, during a time period beginning with a first time and ending with a second time, a database comprising multiple tables, to receive, from a software system managing the database, updates made to the tables during the time period, and to store the received updates to a journal including a raw journal and a set of journal partitions into which the raw journal is split, and by accessing a set of partition records, which specify a lowest key value and a highest key value in each of journal partitions:

to identify, in the journal, a set of the updates not stored in the file, and to update the file with the set of the updates so that the file comprises a transactionally consistent backup of the database.

13. The computer software product according to claim 12, wherein the journal and the file comprise respective structured text files.

14. The computer software product according to claim 13, wherein the structured text files comprise comma-separated value (CSV) files.

15. The computer software product according to claim 12, wherein the journal and the file comprise respective binary files.

16. The computer software product according to claim 12, wherein the journal comprises one or more JavaScript Object Notation (JSON) files.

17. The computer software product according to claim 12, wherein the processors are further configured to generate and convey, to the software system, queries that request the updates, wherein the processors are configured to receive the updates by receiving responses to the queries that include the updates.

18. The computer software product according to claim 17, wherein the processors are configured to generate and convey the queries during the time period.

19. The computer software product according to claim 17, wherein the software system comprises a customer relationship management (CRM) application, and wherein the queries comprise calls to an application programming interface (API) of the CRM application.

20. The computer software product according to claim 17, wherein the tables comprise respective sets of fields, and wherein a given one of the responses includes updates to one or more of the fields in one or more of the tables.

* * * * *